(No Model.) 2 Sheets—Sheet 1.

A. P. KJOLLER.
FRICTION CLUTCH PULLEY.

No. 429,456. Patented June 3, 1890.

Witnesses.
Wm. F. Bellows
G. M. Chamberlain

Inventor,
Anders P. Kjoller,
by Chapin & Co.
Attorneys (No Model.) 2 Sheets—Sheet 2.
A. P. KJOLLER.
FRICTION CLUTCH PULLEY.
No. 429,456. Patented June 3, 1890.
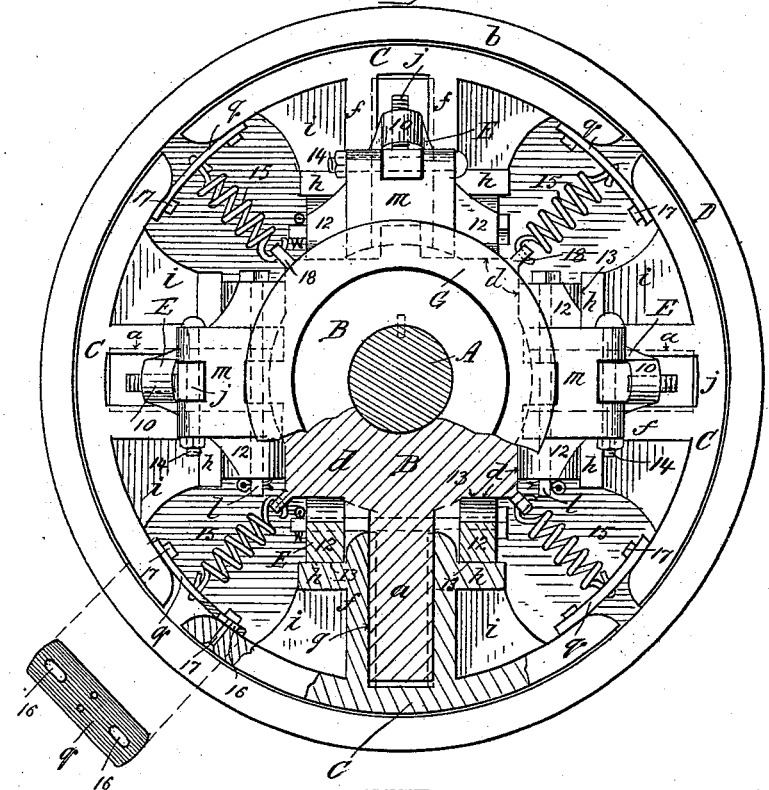
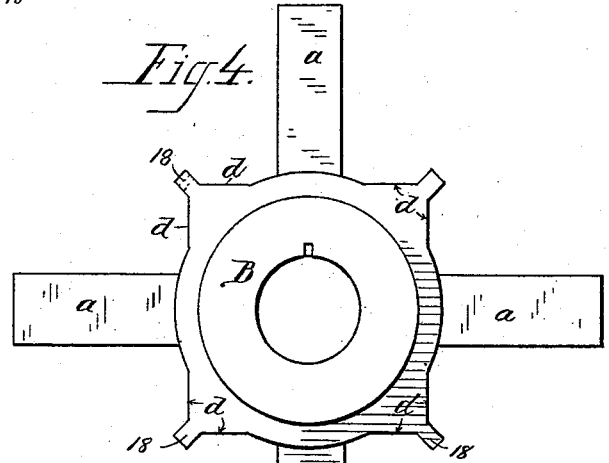
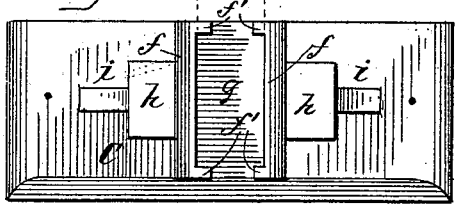
Witnesses:
Inventor,
Anders P. Kjoller,
by Chapin & Co
Attorneys

UNITED STATES PATENT OFFICE.

ANDERS P. KJOLLER, OF HOLYOKE, MASSACHUSETTS.

FRICTION CLUTCH-PULLEY.

SPECIFICATION forming part of Letters Patent No. 429,456, dated June 3, 1890.

Application filed January 23, 1890. Serial No. 337,863. (No model.)

*To all whom it may concern:*

Be it known that I, ANDERS P. KJOLLER, a citizen of the United States, residing at Holyoke, in the county of Hampden and State of Massachusetts, have invented new and useful Improvements in Friction Clutch - Pulleys, of which the following is a specification.

This invention relates to friction clutch-pulleys of the class described in Letters Patent of the United States granted to me June 19, 1888, No. 384,915, the object of the invention being to improve the construction of the clutch-pulley, so that by and from the provision, combination, and arrangement of a few simple and durable parts an effective clutch device may be constituted; and the invention consists in the construction and combination of parts, all substantially as will hereinafter more fully appear, and be set forth in the claims.

Reference is to be had to the accompanying drawings, forming part of this specification, in which like parts are indicated by similar characters of reference.

Figure 2:
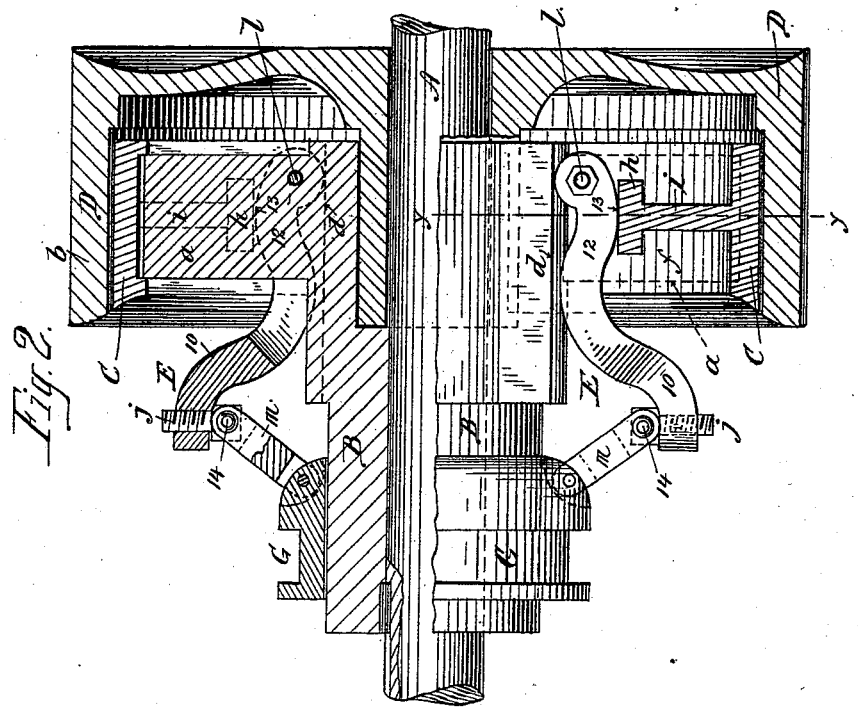
Figure 1:
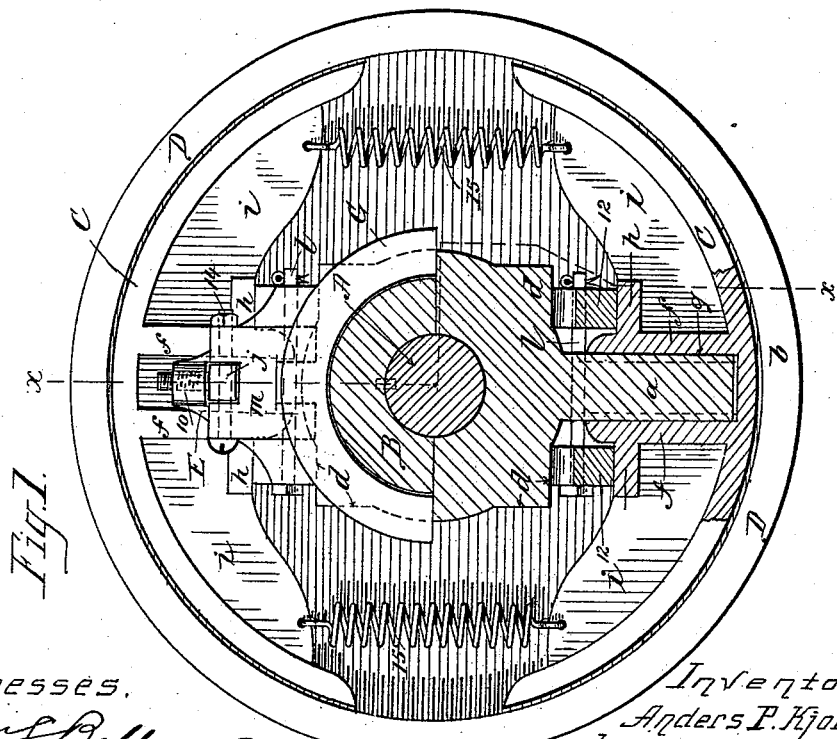

Figure 1 is an elevation across the shaft and at the face of the clutch-pulley, certain parts thereof being shown in cross-section. Fig. 2 is a longitudinal sectional view of the clutch-pulley, taken about on the planes indicated by the lines *x x* in Fig. 1. The parts which are shown in Fig. 1 as in section are taken about on the line *y y* of Fig. 2. Fig. 3 is an elevation view similar to Fig. 1 to illustrate in the invention its susceptibility of being embodied in a clutch having multiple radially-acting friction-shoes. Fig. 4 is an end elevation of the sleeve, such as is embodied in the clutch mechanism of Fig. 3; and Fig. 5 is a plan of the inner side of one of the friction-shoes.

This clutch mechanism comprises the driving-shaft A, having fixed thereon a rather long sleeve B, provided with radial arms *a a*, in number corresponding to the number of friction-shoes C to be provided in the clutch mechanism, the pulley D, loose on the shaft and having its rim *b* extended to overlie the said arms, and the friction-shoes, which are to be guided thereon against the inner surface of said rim. In addition to the shaft, sleeve, pulley, and movable shoes, the mechanism includes levers E, fulcrumed to suitable parts of the said sleeve and capable of acting between said sleeve and said shoes to force the latter against the rim, and means for securing a swinging of said levers.

I will now describe the mechanism in detail, mainly in connection with Figs. 1 and 2, as embodying an approved way of carrying out the invention.

The sleeve B, which is keyed to the shaft and has at diametrically-opposite sides of the portion thereof which lies within the rim of the pulley the radial arms *a a*, which in cross-section are of rectangular or other equivalent or suitable shape, also has formed at each side of the base of each arm a ledge, as indicated at *d*. (See Figs. 1, 2, and 4.)

Each segmental shoe has its arc-shaped outer surface conforming to the inner peripheral surface of the pulley-rim, and perpendicularly projected inwardly from its central portion the shoe has the opposing upright walls or posts *f f*, the edges of which are inwardly flanged, as at *f'*, and conduce to form perpendicular socketed casings, the substantially rectangular sockets *g* therein closely fitting and adapted to slide on the arms *a*. The said upright walls are laterally and integrally extended in the platforms *h h*, which lie, when the shoes are placed upon their guiding sleeve-arms *a*, opposite to, separated from, and parallel with the said ledges *d* of the sleeve. The said perpendicular socket-forming walls *f f* and the platforms are preferably re-enforced by the webs *i i*, cast integrally therewith and with the arc-shaped shoe proper.

The shoe-operating levers E, as to their longitudinal contour, are of suitable curved or angular form, and each thereof consists of a single outer arm 10, which continues inwardly in the separated double arms 12 12, that diverge laterally from a plane coincident with the axis of the shaft to pass at each side of a radial arm *a* of the sleeve and to bear by their "backs" on portions 13 upon said platforms *h* of the shoes, and inside of said backs 13 both arms of the bifurcated or Y-shaped lever are pivotally confined on the radial arm by the pin or rod *l*, which passes through said radial arm and both arms 12 12. It will be noticed that the surface of the extremity of each lever-arm which is inside of its pivotal point or toward the axis of the shaft from said point is concentric with said pivotal point, and said surface always rests upon the adjacent ledge $d$, and such contact between the extremity of the lever-arm and the ledge forms a bearing for a rolling fulcrum, whereby the greater part of the strain put upon the lever to operate the shoe is resisted, and whereby the pivot-pin $l$ is relieved from all considerable strain.

It will of course be understood that by forcing the outer end of the lever outwardly—that is, away from the axis of the shaft—the said lever being fulcrumed at its pivot and at its contact with the said ledge of the sheave, a prying action is exerted by the back 13 of each arm against the platform of the shoe, which secures the forcing of said shoe outwardly to its action against the rim of the pulley. It will be plain that the formation of the parts whereby the contact between the concentric end portion of the lever-arms and the ledges is insured is not a necessity in the clutch, for by depending upon the pivot $l$ alone the same action on the shoe may ensue on swinging the lever; but in such an equipment of the clutch mechanism, the pivot having so much greater strain to resist or support, the said mechanism will not be nearly as durable.

The devices for insuring an operative action of the levers to effect the clutching of or by the mechanism described consist in a collar G, adapted to slide on the sleeve B, and a link $m$ for each lever E, by its one end secured thereto and by its other to the collar. I prefer to make the connection of the link with the arm 10 of the bifurcated operating-lever by means of the bolt $j$, passing with a screw-threaded engagement laterally or radially with respect to the axis of the shaft through said arm 10, and to the head of said bolt pivoting the one end of the link. By disconnecting the pivot-pin 14, which passes through the bolt-head and the ear-pieces of the link, and giving the bolt one or more rotations, or even a fraction of a rotation, and again pivot-connecting the link, practically the length of the bifurcated lever between its fulcrum and link-pivot is altered, whereby a greater or lesser outward throw of the lever, as the case may be, will insure the proper projection of the shoe to bear for action on the pulley-rim.

As shown in Fig. 1, spiral springs 15 15 are secured by their ends to the webs of the opposing shoes, said springs serving to retract the shoes from contact with the pulley-rim when, through the sliding of the collar in the proper direction, the levers have their backs in inward dispositions.

In Figs. 3 and 4 the mechanism and parts thereof are shown as adapted to constitute a multiple shoe-clutch, but without departing from the essential features of the invention, and the hub is here shown as provided with four radial arms $a$, pairs thereof being diametrically opposite to each other, and one pair of arms standing at right angles to the line of the other pair. The hub is now provided with four pairs of ledges $d$ $d$ adjacent the bases of said arms, and the shoes C being four in number—one for each arm—substantially the same as those described in the clutch illustrated in Figs. 1 and 2, but are necessarily shorter as to their length to bear upon the inner peripheral surface of the pulley-rim, and the ends of said shoes lie in proximity, as shown. The inwardly-drawing springs for the shoes are, however, applied in a little different manner from that seen in Fig. 1, to be now described. The adjacent ends of each two shoes have secured thereto a plate $q$, said plate having longitudinal slots 16 therein, through which the shanks of the headed pins 17 pass. To the middle of each plate is attached one end of the spiral spring, which by its other is attached to the lug 18, formed on the hub intermediate of two of the pairs of ledges. As the shoes move inwardly or outwardly, the slight longitudinal movements which the pins 17 have with them are permitted without any interference by the plates on account of the provision of the said slots 16.

It will be seen that the number of parts employed in the clutch is reduced almost to a minimum, although, if desired, in lieu of having the adjustable connection between the links and the ends of the bifurcated levers, such form of connection may be omitted and the links may be pivoted directly to the levers. It is, however, deemed so advantageous to employ said adjustable connection that simplicity is, in the slight degree indicated, to be preferably sacrificed to complete equipment.

What I claim as my invention is—

1. In a friction clutch-pulley, the combination, with the shaft having the sleeve fixed thereon, provided with one or more radial arms and a bearing-surface or ledge at the base of each of such arms, and the loose pulley, of a friction-shoe for each radial arm formed for a sliding and guided bearing thereon, each of which shoes is provided with a bearing-platform, as $h$, a lever for each shoe, pivoted on the radial arm carrying said shoe, and having its extremity concentric with said pivot and bearing upon said ledge, each of said levers being by another portion thereof formed to have a forcing bearing upon the said platform of the shoe adjacent thereto, and an appliance for swinging said levers, substantially as and for the purpose set forth.

2. In a friction clutch-pulley, the combination, with the shaft having the fixed sleeve thereon, which is provided with one or more radial arms, and the loose pulley, of a friction-shoe for each radial arm formed for a sliding and guided bearing thereon, a lever for each shoe fulcrumed on the said sleeve and having a forcing action upon said shoe, and provided with the bolt having a screw and adjustable engagement with the extremity of said lever, a sliding collar, and a link for each lever and connected to the adjusting-bolt thereof and to said sliding collar, substantially as and for the purpose set forth.

3. In a friction clutch-pulley, the combination, with the shaft having the sleeve fixed thereon, which is provided with the radial arms $a$ and a pair of ledges or bearing-surfaces at each side of the bases thereof, the friction-shoes having socket-forming walls, and by the said sockets fitting on said arms, said walls being continued in the laterally-extended platforms $h$ opposite said ledges, levers of bifurcated form, comprising the pairs of arms 12 12 and the arm 10 common thereto, which by said separated arms rest at each side of their respective shoe-guiding arms and by their extremities are pivoted to said arms, and which have their portions adjacent said ledges formed concentric with said pivots and by their opposite portions formed eccentrically to said pivots and adapted to bear for a prying action on said shoe-platforms, and an appliance for swinging said levers, substantially as described.

4. In a multiple-shoe friction clutch-pulley, the combination, with the shaft and the sleeve fixed thereon, having the several radial arms $a$, and shoes having sliding and guided movements on said radial arms, of operating-levers fulcrumed on said sleeve and acting between same and said shoes, the slotted plates $q$, and the headed pins 17, engaging same and the adjacent extremities of said shoes, and springs secured to said plates and to said sleeve, substantially as and for the purpose set forth.

ANDERS P. KJOLLER.

Witnesses:
   WM. S. BELLOWS,
   G. M. CHAMBERLAIN.